United States Patent [19]
Ando et al.

[11] Patent Number: 6,165,923
[45] Date of Patent: Dec. 26, 2000

[54] COATING COMPOSITION FOR CARBONIZATION CHAMBER OF COKE OVEN AND APPLICATION METHOD

[75] Inventors: Takeshi Ando; Shizuki Kasaoka, both of Okayama; Teruo Onozawa, Hyogo; Shigeru Nakai, Kanagawa, all of Japan

[73] Assignees: Kawasaki Steel Corporation; Taiho Industries Co., Ltd., both of Japan

[21] Appl. No.: 09/142,453

[22] PCT Filed: Feb. 4, 1998

[86] PCT No.: PCT/JP98/00466

§ 371 Date: Sep. 8, 1998

§ 102(e) Date: Sep. 8, 1998

[87] PCT Pub. No.: WO98/38144

PCT Pub. Date: Mar. 9, 1998

[30] Foreign Application Priority Data

Feb. 28, 1997 [JP] Japan ................................. 9-046123

[51] Int. Cl.$^7$ ............................ C04B 35/66; C04B 41/86
[52] U.S. Cl. ................................. 501/63; 501/14; 501/20; 501/24; 501/65; 501/69; 501/73; 501/77; 427/372.2; 427/397.7; 427/230
[58] Field of Search .................. 501/14, 20, 24, 501/63, 65, 69, 73, 77; 427/372.2, 397.7, 397.8, 230, 379

[56] References Cited

U.S. PATENT DOCUMENTS

| | | | |
|---|---|---|---|
| 2,925,351 | 2/1960 | Judd | 501/24 |
| 3,668,152 | 6/1972 | Lee | 501/24 |
| 3,671,278 | 6/1972 | Borowski | 501/24 |
| 3,759,240 | 9/1973 | Borowski | 501/77 |
| 3,765,931 | 10/1973 | Kyri et al. | 501/20 |
| 3,772,043 | 11/1973 | Michael | 501/20 |
| 3,939,295 | 2/1976 | Robertson et al. | 501/73 |
| 4,361,654 | 11/1982 | Ohmura et al. | 501/63 |
| 4,732,794 | 3/1988 | Hyde | 501/73 |
| 4,877,758 | 10/1989 | Lee et al. | 501/63 |
| 5,013,362 | 5/1991 | Joseph et al. | 501/77 |
| 5,145,804 | 9/1992 | Schittenhelm et al. | 501/24 |
| 5,188,989 | 2/1993 | Winkelbauer et al. | 501/26 |
| 5,262,363 | 11/1993 | Yoshida et al. | 501/63 |
| 5,296,415 | 3/1994 | Podesta | 501/63 |
| 5,304,516 | 4/1994 | Clifford | 501/24 |
| 5,650,364 | 7/1997 | Mundstedt et al. | 501/24 |

FOREIGN PATENT DOCUMENTS

WO95/31418  11/1995  WIPO .

*Primary Examiner*—Michael Marcheschi
*Attorney, Agent, or Firm*—Austin R. Miller

[57] ABSTRACT

The present invention provides a coating layer of the coke oven having a high strength, high impact resistance and excellent smoothness to enable long term protection of the fire brick of the coke oven. Carbon adhered to the brick can be removed by spraying a coating agent with a glaze layer mainly composed of 18 to 70% by weight of $SiO_2$ and 10 to 60% by weight of $Na_2O$ and/or $K_2O$ and containing one or a plurality of 2 to 14% by weight of $P_2O_5$, 0.5 to 25% by weight of BaO, 0.5 to 25% by weight of SrO and 0.5 to 20% by weight of $Fe_2O_3$ onto the surface of a high temperature firebrick, thereby obtaining an excellent coating layer.

5 Claims, 3 Drawing Sheets

COATING COMPOSITION FOR CARBONIZATION CHAMBER OF COKE OVEN AND APPLICATION METHOD

TECHNICAL FIELD

The present invention relates to a coating composition for a carbonization chamber of coke ovens, and application method. The present invention also relates to an art for improving durability of fire resistant substances by coating the surface thereof that is not only exposed to a high temperature but also to friction.

BACKGROUND ART

Coke ovens are liable to generate peeling and cracks on their surface and their wall gradually falls off due to friction between the wall and processing materials, or due to frequently repeated cooling and heating. During the conversion process of blended coals to cokes, on the other hands, tar in the blended coals is gasified. The inner wall of the coke oven that has been relatively smooth becomes so greatly roughened and its frictional resistance becomes so large due to severe temperature conditions and sedimentation of carbon particles, causing process materials and carbon particles generated by combustion to adhere on the roughened surface. Accordingly, the wall tends to develope a severely convex and concave surface and the width of the carbonization chamber is narrowed, increasing extrusion resistance of coke, causing a problem in operating the plant. Increased damage of the inner surface of the oven is an another problem.

For solving such problems, WO No. 95/31418 discloses a glaze for preventing adhesion of carbon, wherein the glaze, with a melting point of 900° C. or less, basically comprises $R_2O$ ($Na_2O$ or $K_2O$) and $SiO_2$ in which one or two of the compounds of $Li_2O$ and $B_2O_3$ are preferably added. This glaze contains, based on the oxide content, 10 to 40% of $R_2O$ ($Na_2O$ or $K_2O$), 10% or less of $Li_2O$ and 10% or less of $B_2O_3$ with a balance of $SiO_2$. The publication describes that processors of the aforementioned components are hydroxides, carbonates, nitrates, phosphates, sulfates and chlorides.

The investigators of the present invention independently disclosed an art for surface treatment of high temperature fire resistant materials in Japanese Unexamined Patent Publication No. 8-119775, wherein fire resistance and gas permeation-preventing properties of firebricks, which are exposed to a high temperature in ovens such as ceramic ovens, cement calcination ovens and power generator boilers, are improved. In the art above, a treating material comprising 35.0 to 50.0% of sodium silicate having a molecular ratio of $SiO_2/Na_2O$ of 3.2 to 3.8, 1.0 to 10.0% of lithium hydroxide, 1.0 to 10.0% of sodium borate, 1.0 to 10.0% of organic silicone compounds represented by a formula of R—Si(OH) (wherein R denotes an alkyl group with a carbon number of 1 to 12) and water and having a viscosity of 100 cps (20° C.) or less are coated on the surface of fire bricks heated at a surface temperature of 500 to 1000° C. with a spray nozzle in a thickness of 0.05 to 4.0 kg/m² (based on the unit surface area of the fire bricks), thereby foaming a fused coating layer on the surfaces of the firebricks. When the temperature is increased thereafter, a treated layer having a high purity of $SiO_2$ having a smooth and strong surface can be obtained by reacting the surface layers of the firebricks with the fused coating layer and by causing sodium atoms to be scattered off.

DISCLOSURE OF INVENTION

The investigators of the present invention have continued collective studies to develop superior coating materials, obtaining a coating material for a carbonization chamber of coke ovens having more excellent properties than the prior art described above.

Accordingly, the object of the present invention is to provide an excellent coating composition for a carbonization chamber of coke ovens having a different composition from the prior art.

The present invention comprises a coating composition for a carbonization chamber of coke ovens in which the following technical measures are applied.

In a first aspect, the present invention provides a coating composition for a carbonization chamber of coke ovens, characterized in that the glaze is mainly composed of 18 to 70% by weight of $SiO_2$ and 10 to 60% by weight of $Na_2O$ and/or $K_2O$ and contains one or a plurality of the following compounds:

1 to 14% by weight of $P_2O_5$;
0.5 to 25% by weight of BaO;
0.5 to 25% by weight of SrO; and
0.5 to 20% by weight of $Fe_2O_3$ The glaze used in the present invention contains alkali silicates as main components.

While alkali silicates containing 18 to 70% by weight of $SiO_2$ and 10 to 60% by weight of $Na_2O$ and/or $K_2O$ based on oxides are conventionally used, the composition is not exceptional in the present invention but alkali silicate having the same composition are used. Water glass is advantageously used since the coating composition according to the present invention is, as described hereinafter, used by spraying it to the surfaces of high temperature bricks.

Though any starting materials can be used as $P_2O_5$ sources provided that they finally exist as $P_2O_5$ in the resulting glaze, combinations of sodium silicates and potassium silicates as $Na_2O$ and/or $K_2O$ sources may be selected by considering that the starting materials originating in sodium phosphate and/or potassium phosphate can substitute for a part of the $Na_2O$ and/or $K_2O$.

It is preferable that all or a part of aforementioned $P_2O_5$ sources come from compounds selected from one or a plurality of calcium phosphate, magnesium phosphate, aluminum phosphate, barium phosphate and iron phosphate because these compounds do not react with water glass based glassy materials at a high temperature but form a glass surface with a high melting point on the surface of the glass layer.

A preferable characteristic is also obtainable when the material contains 0.5 to 10% by weight of $B_2O_3$.

The method for applying the coating composition according to the present invention is as follows: In accordance with another aspect of the present invention, the method comprises preparing an aqueous solution or a slurry of the coating composition, spraying the solution or slurry on the surface of high temperature firebricks while they are heated at 500 to 1400° C., and keeping a temperature of 900° C. or more for 30 minutes or more.

The coating composition according to the present invention, which is formed by adding one or a plurality of P, Ba, Sr and Fe to sodium silicate and/or potassium silicate, is a chemical that serves for forming a glaze layer having a high melting point, high strength and smoothness by its oxidative elimination function against carbon on the surfaces of the firebricks that affects the long term stability of a glass film. Fragility of the glass can be improved by adding a trace amount of Ca, Mg and Al.

P, Ba, Sr, Fe, Ca, Mg and Al compounds are used in the present invention because these compounds are stable in an alkaline region with a high pH value of sodium silicate.

Sodium silicate that is widely known to form a frame of binders and glass materials, when used for a flux, that enhances creeping and adhesion of P, Sr and Ba at the initial stage of processing.

Phosphates with cationic components of sodium and/or potassium are used for the $P_2O_5$ sources. For example, dihydrogen phosphates, hydrogen phosphates, metaphosphates, pyrophosphates and polymeric phosphates (such as tripolyphosphates and heametaphosphates) are used alone or in combination. Although these phosphates have a wide range of melting points of 630 to 1340° C., an addition of a small amount of them lowers the melting point of water glass materials irrespective to the melting point of the phosphate itself to be added. A large amount of addition, on the contrary, increases the melting point. When the content of $P_2O_5$ is 14% by weight or more, the melting point of the glaze is increased so much that its adhesive property is deteriorated. The stability of the product is also decreased when the proportion of $P_2O_5$ is increased in the blending materials. When the proportion of $P_2O_5$ is less than 1%, on the other hand, the function as a glaze is lost, so that formation of a uniform glaze layer is hindered. Accordingly, the content of phosphates is limited, based on the content of $P_2O_5$, in the range of 1 to 14% by weight, more preferably 2 to 8% by weight.

Addition of P in an appropriate range is effective for smoothening the coated surface at the initial stage of coating, along with enhancing its resistance to high temperature chemicals, for example tar vapor and $H_2$ and S gases, that makes contact with glass surfaces (interfaces); thereby the life span of the glass is elongated. Furthermore, a phosphate based glass having a high melting point is progressively formed on the surface of the coating layer to extinguish the adhesive property of the coating layer. P has an ability to prolong the mechanical and chemical life span of the glass.

Ba is converted to BaO in an atmosphere of high temperature air. BaO ($BaO_2$) has such a strong catalytic power for oxidation that carbon permeated into the outer surfaces of bricks is eliminated by oxidation (combustion) as indicated by the following equation:

$$BaO_2 + C = BaO + CO\uparrow$$

(combustion equation of carbon)

$$BaO + \tfrac{1}{2}O_2 = BaO_2$$

(oxidation when the door of the oven is open)

Catalytic power of BaO for oxidation is gradually declined when it is bound to $SiO_2$ in the brick substrate while forming a coating layer without carbon. Since BaO itself has a high melting point of 1923° C., it serves as a film for suppressing decrease of reductive melting point of $SiO_2$.

Sulfates, oxides, hydroxides, carbonates, chlorides and nitrates can be used for BaO sources. The appropriate amount of addition of Ba, based on BaO, 0.5 to 25% by weight. While BaO is in principle used for increasing the melting point of the glaze and strengthening the glaze layer, smoothness of the glaze layer surface is sacrificed when the content of BaO exceeds 25% by weight because a uniform glaze layer can not be formed since non-fused particles are distributed here and there in the glaze layer. When the content is less than 0.5% by weight, on the other hand, the effect for adjusting the melting point can not be displayed along with an insufficient function for extinguishing carbon particles. Therefore, the most preferable range of BaO is 3 to 15% by weight.

Any one of hydroxides, carbonates, chlorides or nitrates, or a mixture thereof is used as a SrO source. Sr is finally converted to SrO having a high melting point of 2430° C. which contributes toward increasing the strength of the glass layer. While Sr compounds are mostly converted to $SrCO_3$ (melting point 1497° C.) by making contact with a high temperature CO gas or with red-heated cokes, they are turned into high melting point SrO at 1350° C. The melting point of SrO is so high that it serves for increasing the melting point and decreasing wettability of the glass layer. These functions are in common with Ba in that adhesion of carbon to the glass surface is prevented at a high temperature.

Nascent oxygen that serves as an immediately effective carbon combustion accelerator at the surface of bricks is generated to decompose carbon on the coated surface when $Sr(NO_3)_2$ is utilized.

$$Sr(NO_3)_2 \rightarrow SrO + 2NO_2 + O$$

Degradation of carbon with $Sr(NO_3)_2$ is immediately effective but temporary while, on the other hand, the functions of BaO and oxides of Fe are somewhat retarded but continuous. Accordingly, it is preferable to use BaO and oxides of Fe together with $Sr(NO_3)_2$ because both characteristics of immediate effect and continuity for decomposition of carbon can be obtained.

SrO contributes to increasing the melting point and strengthening of the glaze layer as BaO does. When the content of SrO is less than 0.5% by weight, the effect for increasing the melting point becomes poor while, when the content exceeds 25% by weight, a uniformly fused layer can not be obtained because non-fused particles are distributed here and there in the glaze layer, thereby smoothness of the glaze surface is sacrificed. Accordingly, its content is limited within a range of 0.5 to 25% by weight. The more preferable range is 3 to 15% by weight by the same reason as described above.

Complex salts such as potassium ferrocyanate and potassium ferricyanate, or iron (II) phosphate, iron (III) phosphate, iron (II) or iron (III) salts of hydrochloric acid, nitric acid or sulfuric acid, and $Fe_3O_4$, $Fe_2O_3$ or FeOOH with a particle size of 200 Angstrom are used as Fe sources. Chelated iron comprising tartaric acid, citric acid, thioglycolic acid, thiocyanic acid or sulfosalicylic acid, EDTA and iron, or chelated iron ammonium compounds prepared by adding ammonia thereto are used as iron sources.

Though Fe functions as a catalyst to oxidize carbon as Ba does, this function is not effected unless the particles are fine. While a particle size of the order of $\mu$m is, for example, not preferable, an aqueous solution of Fe or fine particles of Fe with a particle size of 200 Angstrom or less is very effective. Fe compounds form super-fine particles of FeO, $Fe_3O_4$ and $Fe_2O_3$ that exhibit catalytic functions at high temperature. Fe compounds have been used as a combustion accelerator of coal for a long time and the compound gasifies carbon by the reaction below. Fe component is oxidized by making a contact with the air.

$$FeO \cdot Fe_2O_3 + C = Fe \cdot 2FeO + CO_2 \uparrow$$

(combustion equation of carbon)

$$Fe \cdot 2FeO + O_2 = FeO \cdot Fe_2O_3$$

(oxidation of Fe when the door of the oven is open)

The amount of addition of Fe is, based on $Fe_2O_3$, 0.5 to 20% by weight. When the amount of addition is less than 0.5% by weight, the melting point adjusting effect can not be displayed while, when $Fe_2O_3$ is added in excess of 20% by weight, smoothness of the glaze surface is sacrificed because non-melting particles are distributed here and there in the glaze layer as seen in the case of BaO and SrO. Accordingly, the content is limited to 20% by weight or less, preferably within a range of 3 to 15% by weight.

Since each added component of P, Ba, Sr and Fe has the aforementioned functions by itself alone, and a combined addition of them brings about a synergistic effect in the characteristic of the glaze, a firebrick coating layer without carbon, abounded with durability and having a high strength can be formed. Boron may be added, based on $B_2O_3$, in a proportion of 0.5 to 10% by weight as in the case of sodium silicate glasses. High temperature cohesive properties ascribed to B may be improved by the additives described above to form an excellent coating layer.

The coating composition according to the present invention is prepared as an aqueous solution or as a slurry, sprayed on the high temperature firebrick surface and kept at a temperature of 900° C. or more for 30 minutes or more after spraying. When the temperature is less than 500° C., oxidative carbon elimination reaction will not proceed while, the temperature exceeding 1400° C. is not necessary since the firebrick will be damaged at that temperature. Therefore, the temperature should be limited within the range described above. It is essential to keep the temperature of 900° C for more than 30 minutes after spraying because, when the temperature is less than 900° C., an excellent glass layer will be difficult to obtain while the duration of shorter than 30 minutes is insufficient. The preferable duration is 60 minutes or more.

Figure 1:
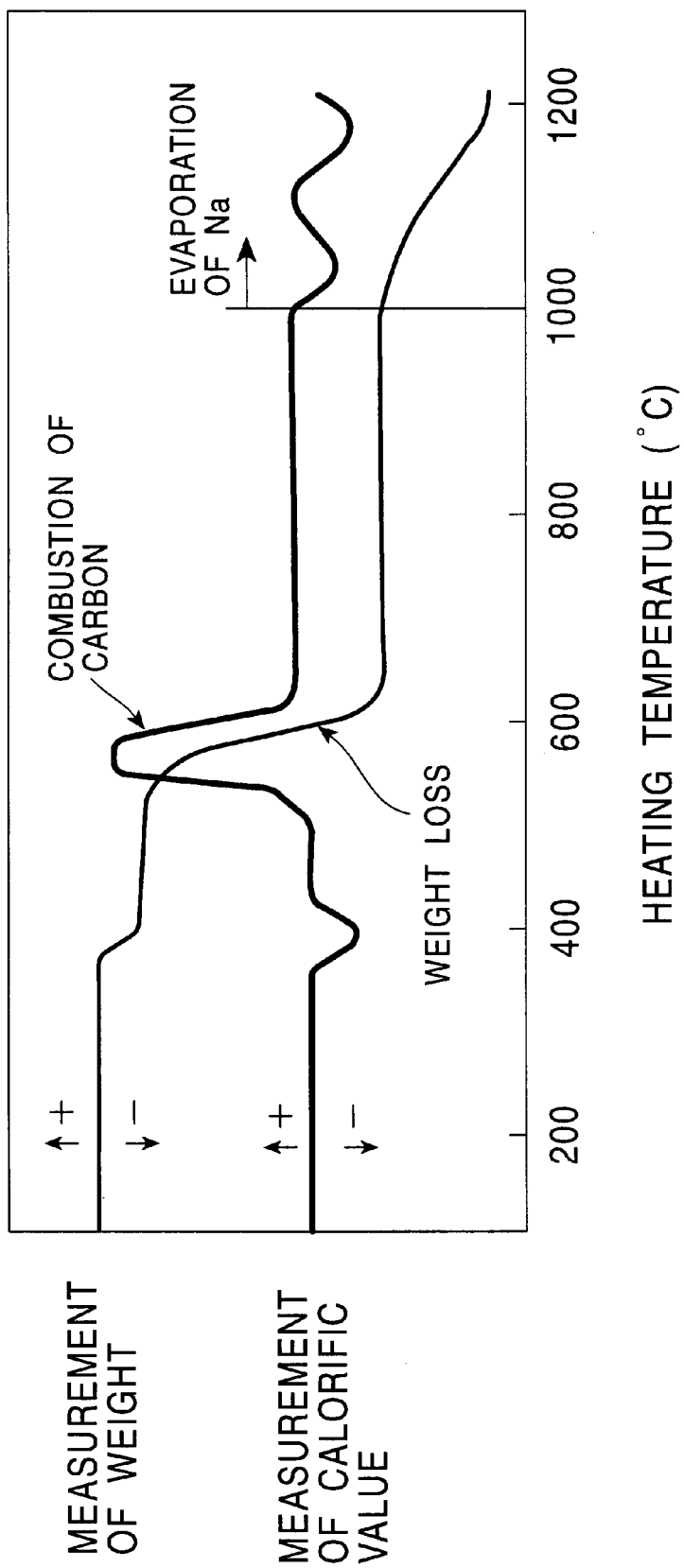
FIG. 1 is a graph showing the combustion efficiency of carbon.

<REFERENCE NUMERALS>
1 Brick
2 Carbon
3 Coating layer
4 Peeled surface portions
5 Void space
6 Smooth surface
7 Concave and convex surface

BEST MODE FOR CARRYING OUT THE INVENTION

Conventional coating materials are mainly composed of a flux (sodium, lithium and boron silicates) having a low melting point, with which the surface of bricks has been smoothed by melting during operation of the coke oven. Since this flux undergoes a thermal change to retard the time period until the temperature reaches 1430° C., it often caused plugging during attemped coke extrusion when a large amount of the flux was coated.

Components such as lithium or boron that function to lower the melting point for a prolonged time were eliminated or reduced in concentration in the present invention. The coating material that contains the components with a melting point lowering function has a drawback that the glass layer formed on the surfaces of the bricks causes persisting cohesion. Since the cohesive property of boron is especially maintained for a long period of time, the drawback of boron was solved by adding components that allow the melting point to be immediately increased.

In the coating composition according to the present invention, the foregoing problem was solved by blending P, Ba, Sr, and Ca, Mg and Al salts of phosphoric acid. These components have a high cohesive property at a high temperature at the initial stage of coating but, after few hours, they turn into components having a high melting point concentrated at the surface proximate to the coating layer.

The function of the present invention will be described hereinafter referring to the drawings.

Figure 2:
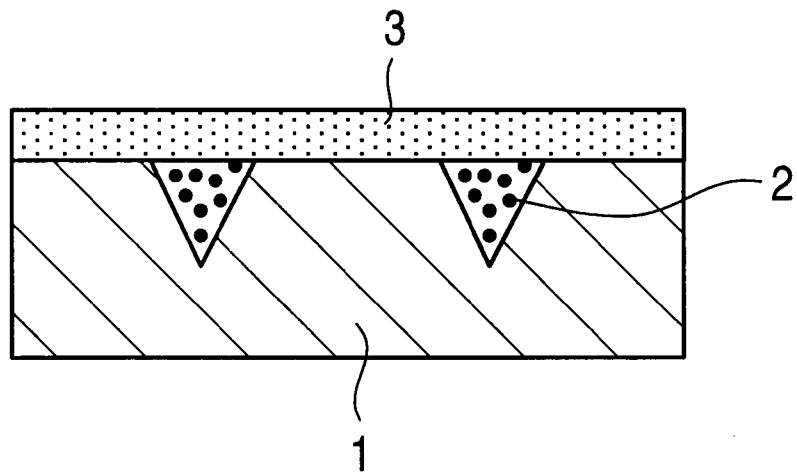
FIG. 2 is a schematic cross section proximate to the surface layer of the brick.
Figure 3:
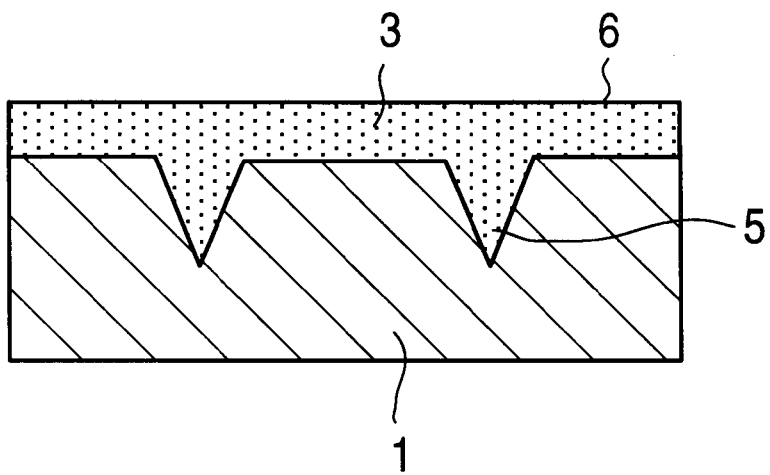
FIG. 3 is a schematic cross section proximate to the surface layer of the brick.
Figure 4:
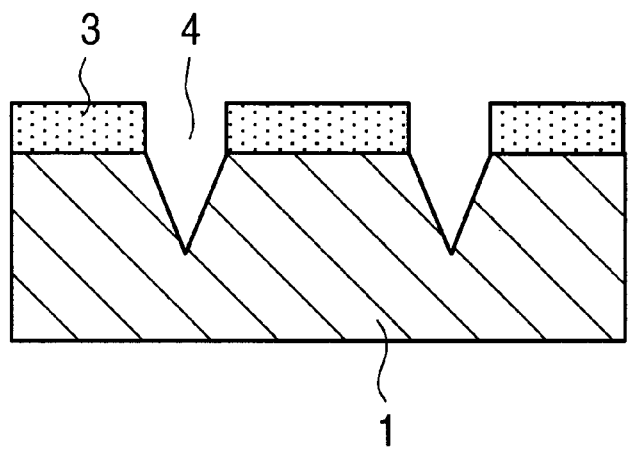
FIG. 4 is a schematic cross section proximate to the surface layer of the brick.

FIG. 2 and FIG. 3 are illustrative cross sections taken proximate to the surface of the brick 1. There is carbon 2 in the coated surface (coating liquid permeating portion) of the brick 1. In the conventional art, however, carbon 2 slowly but finally disappears as shown in FIG. 4, forming surface portions that have peeled away at 4 to decrease the adhesive strength of the coating layer 3 itself when carbon 2 is wrapped in the coating layer 3 as shown in FIG. 2. The surface of the coating layer 3 is peeled off when such cokes are extruded. Consequently, the smoothness of the surface is lost and carbon particles start to grow at the peeled surface portions 4 where carbon is tightly adhered.

According to the present invention, carbon on the surfaces of the bricks is caused by promptly disappear by taking advantage of an oxidative catalytic reaction caused by blending either a Ba, Sr or Fe compound into the composition. Carbon 2 on the brick surface 1 is made to simultaneously disappear when the coating layer 3 shown in FIG. 3 is formed, thereby making it possible, as shown in FIG. 3, to form a coating layer 3 including the fine void spaces 5 on the surfaces of the bricks.

FIG. 1 is a graph showing the carbon combustion efficiency in the coating composition according to the present invention. The graph indicates weight changes and calorific values when a mixture of the coating composition according to the present invention with coke powder (assumed to be carbon) is reacted in an atmosphere containing 0.2% of oxygen. Reduction of the carbon weight and increase of the calorific value are clearly indicated at a heating temperature range of 500° C. to 600° C., showing the presence of a carbon elimination effect. This result suggests that a tough coating layer could be formed as hitherto described even when carbon generated by carbonization has penetrated into fine void spaces. Moreover, a tough coating layer could be formed as well in forming the coating layer provided that a small amount of carbon remains on the wall surface of the carbonization chamber. These facts have a practical importance in that elimination of carbon on the wall surface of the carbonization chamber can be easily eliminated during coating.

Figure 5:
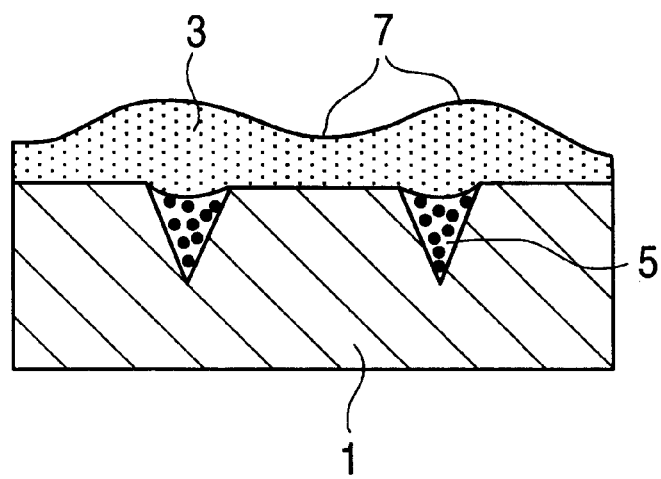
FIG. 5 is a schematic cross section proximate to the surface layer of the brick.

Blending of either Ba, P or Sr compounds makes it possible to reduce viscosity of the fused layer (before vitrification) immediately after coating with the coating composition and to improve smoothness of the layer by improving wettability. It was difficult for the coating material in the conventional example to permeate into the void space 5 as shown in FIG. 5 because of its high viscosity. While a concave and convex surface 7 was formed in the conventional example, a smooth surface 6 is obtained as shown in FIG. 3, besides which the coating composition is able to permeate deep into the interior of the void space 5.

As hitherto described, the coating composition according to the present invention causes carbon to be promptly removed by an oxidative catalytic reaction along with forming an excellent glass layer having a higher melting point, strength and smoothness than conventional materials allow.

When metal salts of phosphoric acid (Mg, Ca, Al, Ba and Fe salts) are added or formed by high temperature reaction of phosphoric acid with metals, these compounds do not react with glassy components in the water glass but remain unchanged. Since these metal salts have different melting points than glassy substances (water glass and fluxes) in the water glass, the metal salts are mainly distributed near the glass surface within a short period of time forming a thin but solid glass film with a high melting point. Accordingly, the composition comprising metal salts of phosphoric acid such as calcium phosphate serves for strengthening and improving the surface of the glassy substances in the water glass.

The surface of the coated bricks contains carbon due to penetration of tar generated in the carbonization process. In the conventional coating agent, this carbon was gradually decomposed and disappeared after coating, thus forming void spaces between the coating layer and brick surface, thereby decreasing the strength and reducing the life span or the coating. According to the present invention, carbon is oxidized and eliminated at the initial stage of coating, along with forming a coating film having a higher melting point, higher strength and better smoothness than conventional ones.

The coating composition for the carbonization chamber of coke ovens according to the present invention is formed into an aqueous solution or a slurry by adding water, and is sprayed on the surface of the firebricks at the interior wall of the coke oven. The sprayed coating composition is vitrified at a high temperature forming a solid glass layer. Therefore, the surface temperature of the coated bricks should be higher than the temperature required for melting the solid fraction of the composition after evaporating water from the aqueous solution or slurry.

EXAMPLES

An aqueous solution or a slurry was prepared by adding phosphoric acid alkali salts, phosphoric acid metal salts, barium sulfate, iron compounds, strontium compounds, magnesium carbonate, aluminum oxide (alumina), sodium aluminate and water to main components comprising water glass No. 1 ($Na_2O$: 17 to 19% by weight, $SiO_2$: 35 to 38% by weight, water: % by weight of a balance) and water glass No. 2 ($Na_2O$: 14 to 15% by weight, $SiO_2$: 34 to 36% by weight, water: % by weight of a balance), water glass No. 3 ($Na_2O$: 9 to 10% by weight, $SiO_2$: 28 to 30% by weight, water: % by weight of a balance), each being prescribed in JIS K 1408, sodium silicate and potassium silicate. The contents of these compositions are listed in Table 1, 2 and 3. Table 4, 5 and 6 show the amounts of the components converted into oxides (except those volatile at high temperature). The aqueous solutions or slurries shown in Table 1, 2 or 3 were sprayed onto the surfaces of firebrick samples heated at 700° C. to which carbon was adhered. The compositions of the firebricks are as shown in Table 7. The proportion of spray was fixed to 0.1 kg per 1 $m^2$ of the surface area. After spraying, the firebrick samples were kept at 950° C. for 60 minutes, followed by standing to cool to room temperature. The hot adhesive property, the adhesive property of the glaze layer with the brick after cooling, the smoothness of the glaze surface and the hot impact resistance of the glaze surface were tested. The test methods and evaluation methods are described below. The same tests were applied to the comparative examples (conventional examples) whose compositions are listed in Table 8. The composition after converting the composition of each ingredient (except those volatile at high temperature) is shown in Table 9.

(a) Hot adhesive property of glaze surface
Test method:
  The glaze layer is pressed with a flat bottom-faced steel cylinder for 1 minute while the brick is kept at 950 C., followed by pulling back the cylinder. Adhesive resistance of steel against the glaze layer was evaluated by visual observation. The glaze layer having a high adhesive property tends to be drawn out into a thread having a longer thread when the adhesive property is stronger.
Evaluation designations:
  ⊚ Not adhesive at all
  ○ Little adhesive
  Δ Slightly adhesive
  × strongly adhesive (b) Adhesive property of the glaze layer with the brick after cooling
Test method:
  The brick after cooling was dropped from a height of 2 m and the condition of the brick was observed.
Evaluation designations:
  ⊚ Perfect adhesion
  ○ Peeling of about 10%
  Δ Peeling of about 20%
  × Peeling of more than 50%

(c) Smoothness of the glaze surface layer
Test method:
  The brick after cooling was evaluated by visual observation and finger touch.
Evaluation designations:
  ⊚ Perfectly smooth
  ○ Partly convex
  Δ Concave and convex surface (d) Hot impact resistance of the glaze surface layer
Test method:
  The glaze layer is press-cut with a steel cylinder having a sharp chip while keeping the brick at 950° C. and the appearance of the glaze layer was observed for evaluation.
Evaluation designations:
  ⊚ Tight surface without scratches
  ○ Tight surface with partly scratched
  Δ Cracks at the impact portion As is evident from the results in Tables 1 to 9, characteristics of the coating compositions for the carbonization chambers of coke ovens in the examples according to the present invention are improved, and their durability is higher than those in the comparative examples. Especially, the coating agents in which a plurality of P, Ba, Fe, Sr, Al and Mg are added exhibit quite excellent characteristics.

TABLE 1

|  | Example |  |  |  |  |  |  |
|---|---|---|---|---|---|---|---|
|  | 1 | 2 | 3 | 4 | 5 | 6 | 7 |
| Water glass No. 1 |  |  |  | 40 |  |  | 30 |
| Water glass No. 2 |  | 40 |  |  |  |  |  |
| Water glass No. 3 | 40 |  |  |  |  | 30 |  |
| Sodium silicate |  |  |  |  | 25 |  |  |
| Potassium silicate |  |  |  |  |  | 30 |  |
| Sodium borate |  | 5 |  | 6 |  | 5 | 3 |
| Sodium dihydrogen phosphate |  | 3 |  |  |  |  |  |
| Potassium pyrophosphate | 4 |  |  |  |  |  |  |
| Sodium hexametaphosphoric acid |  |  |  |  |  |  |  |
| Calcium phosphate |  |  |  |  |  |  |  |
| Aluminum phosphate |  |  |  |  |  |  |  |
| Barium sulfate |  |  |  |  |  |  | 10 |
| Barium nitrate |  |  | 10 |  |  |  |  |
| Potassium ferrocyanate |  |  |  |  | 5 |  |  |
| Fe (II) sulfate |  |  |  |  |  |  |  |
| Strontium carbonate |  |  |  |  |  | 10 | 8 |
| Strontium chloride |  |  |  |  |  |  |  |
| Magnesiun carbonate |  |  |  |  |  |  |  |
| Aluminum oxide |  |  |  |  |  |  |  |
| Sodium aluminate |  |  |  |  |  |  |  |
| Lithium hydroxide |  |  |  |  |  |  |  |
| Water | 56 | 52 | 50 | 64 | 60 | 57 | 57 |
| Hot adhesive property of the glaze surface | ○ | Δ | ○ | Δ | ○ | ○ | ○ |
| Adhesion between glaze layer and bricks | Δ | ○ | Δ | ○ | Δ | Δ | ○ |
| Smoothness of the glaze surface layer | Δ | ○ | Δ | Δ | Δ | Δ | Δ |
| Hot impact resistance of the glaze layer surface | Δ | Δ | Δ | Δ | Δ | ○ | Δ |

Hot adhesive property of the glaze surface
◎ Not adhesive at all ○ Little adhesive Δ Slightly adhesive x strongly adhesive
Adhesion between glaze layer and bricks
◎ Perfect adhesion ○ Peeling of about 10% Δ Peeling of about 20% x Peeling of more than 50%
Smoothness of the glaze surface layer
◎ Perfectly smooth ○ Partly convex Δ Concave and convex surface
Hot impact resistance of the glaze layer surface
◎ Tight surface without scratches ○ Tight surface with partly scratched
Δ Cracks at the impact portion

TABLE 2

|  | Example |  |  |  |  |  |  |
|---|---|---|---|---|---|---|---|
|  | 8 | 9 | 10 | 11 | 12 | 13 | 14 |
| Water glass No. 1 |  |  |  |  |  |  |  |
| Water glass No. 2 |  |  |  |  |  | 60 |  |
| Water glass No. 3 |  |  | 40 |  |  |  |  |
| Sodium silicate |  |  |  |  |  |  |  |
| Potassium silicate | 25 | 25 |  | 20 | 25 |  | 15 |
| Sodium borate |  | 5 | 8 |  |  | 10 |  |
| Sodium dihydrogen phosphate |  |  |  |  |  |  |  |
| Potassium pyrophosphate |  |  | 4 |  |  | 3 |  |
| Sodium hexametaphosphoric acid |  |  |  | 4 |  |  |  |
| Calcium phosphate |  |  |  |  | 4 |  |  |
| Aluminum phosphate |  |  |  |  |  |  |  |
| Barium sulfate |  |  |  | 8 | 5 |  |  |
| Barium nitrate |  | 10 |  |  |  |  | 5 |
| Potassium ferrocyanate |  | 5 |  |  |  |  |  |
| Fe (II) sulfate | 10 |  | 10 |  | 5 | 4 |  |
| Strontium carbonate |  |  | 8 | 8 |  |  |  |
| Strontium chloride |  |  |  | 10 |  |  | 4 |
| Magnesium carbonate |  |  |  |  |  |  |  |

TABLE 2-continued

|  | Example |  |  |  |  |  |  |
|---|---|---|---|---|---|---|---|
|  | 8 | 9 | 10 | 11 | 12 | 13 | 14 |
| Aluminum oxide |  |  |  |  |  |  |  |
| Sodium aluminate |  |  |  |  |  |  |  |
| Lithium hydroxide |  |  |  |  |  | 2 |  |
| Water | 65 | 56 | 40 | 60 | 53 | 13 | 72 |
| Hot adhesive property of the glaze surface | Δ | Δ | Δ | Δ | ○ | ○ | ○ |
| Adhesion between glaze layer and bricks | Δ | ○ | ◎ | Δ | Δ | ○ | ○ |
| Smoothness of the glaze surface layer | Δ | ○ | Δ | ○ | ○ | ○ | ○ |
| Hot impact resistance of the glaze layer surface | ○ | ○ | Δ | ○ | ◎ | ○ | Δ |

Hot adhesive property of the glaze surface
◎ Not adhesive at all ○ Little adhesive Δ Slightly adhesive x strongly adhesive
Adhesion between glaze layer and bricks
◎ Perfect adhesion ○ Peeling of about 10% Δ Peeling of about 30% x Peeling of more than 50%
Smoothness of the glaze surface layer
◎ Perfectly smooth ○ Partly convex Δ Concave and convex surface
Hot impact resistance of the glaze layer surface
◎ Tight surface without scratches ○ Tight surface with partly scratched
Δ Cracks at the impact portion

TABLE 3

|  | Example |  |  |  |  |  |
|---|---|---|---|---|---|---|
|  | 15 | 16 | 17 | 18 | 19 | 20 |
| Water glass No. 1 |  |  |  |  |  |  |
| Water glass No. 2 |  |  | 23 |  | 50 |  |
| Water glass No. 3 | 28 | 32 |  | 40 |  |  |
| Sodium silicate |  |  |  |  |  |  |
| Potassium silicate |  |  |  |  |  | 25 |
| Sodium borate | 3 | 4 | 8 | 5 |  | 7 |
| Sodium dihydrogen phosphate | 4 | 3 |  |  | 5 |  |
| Potassium pyrophosphate |  |  | 2 |  |  |  |
| Sodium hexametaphosphoric acid |  |  |  | 3 |  | 4 |
| Calcium phosphate |  |  | 5 |  |  | 4 |
| Aluminum phosphate |  |  |  | 4 |  |  |
| Barium sulfate |  |  | 3 |  | 7 | 5 |
| Barium nitrate |  |  |  | 3 |  |  |
| Potassium ferrocyanate | 7 | 6 |  |  | 5 | 4 |
| Fe (II) sulfate |  |  |  |  |  |  |
| Strontium carbonate |  |  |  |  |  | 3 |
| Strontium chloride |  |  |  | 3 | 5 |  |
| Magnesiun carbonate |  |  |  | 4 |  |  |
| Aluminum oxide |  |  |  | 3 |  | 2 |
| Sodium aluminate |  |  |  | 4 |  |  |
| Lithium hydroxide | 4 |  |  |  |  | 2 |
| Water | 54 | 55 | 52 | 38 | 28 | 44 |
| Hot adhesive property of the glaze surface | ○ | ○ | ○ | ◎ | ◎ | ◎ |
| Adhesion between glaze layer and bricks | ◎ | ○ | ◎ | ◎ | ◎ | ◎ |
| Smoothness of the glaze surface layer | ○ | ○ | ○ | ○ | ◎ | ◎ |
| Hot impact resistance of the glaze layer surface | ○ | ◎ | ◎ | ◎ | ◎ | ◎ |

Hot adhesive property of the glaze surface
◎ Not adhesive at all ○ Little adhesive Δ Slightly adhesive x strongly adhesive
Adhesion between glaze layer and bricks
◎ Perfect adhesion ○ Peeling of about 10% Δ Peeling of about 30% x Peeling of more than 50%
Smoothness of the glaze surface layer
◎ Perfectly smooth ○ Partly convex Δ Concave and convex surface
Hot impact resistance of the glaze layer surface
◎ Tight surface without scratches ○ Tight surface with partly scratched
Δ Cracks at the impact portion

TABLE 4

| | Example | | | | | | |
|---|---|---|---|---|---|---|---|
| | 1 | 2 | 3 | 4 | 5 | 6 | 7 |
| SiO$_2$ | 58.8 | 50.4 | 51.4 | 35.7 | 31.6 | 41.2 | 43.6 |
| Na$_2$O | 24.4 | 39.9 | 25.4 | 49.7 | | 31.4 | 29.3 |
| K$_2$O | 9.7 | | | 7.3 | 49.5 | | |
| P$_2$O$_5$ | 7.1 | 4.7 | | | | | |
| B$_2$O$_3$ | | 4.8 | | 4.7 | | 5.5 | 3.1 |
| BaO | | | 12.2 | | | | 24.0 |
| Fe$_2$O$_3$ | | | | 2.6 | | | |
| SrO | | | | | 18.9 | 22.0 | |
| CaO | | | | | | | |
| MgO | | | | | | | |
| Al$_2$O$_3$ | | | | | | | |
| Li$_2$O | | | | | | | |

TABLE 5

| | Example | | | | | | |
|---|---|---|---|---|---|---|---|
| | 8 | 9 | 10 | 11 | 12 | 13 | 14 |
| SiO$_2$ | 33.8 | 24.9 | 35.2 | 27.6 | 23.8 | 40.4 | 26.3 |
| Na$_2$O | | 47.7 | 29.1 | | 2.9 | 30.8 | |
| K$_2$O | 52.4 | 6.3 | 7.0 | 43.1 | 36.9 | 3.3 | 41.1 |
| P$_2$O$_5$ | | | 5.2 | | 6.8 | 6.0 | |
| B$_2$O$_3$ | | 3.6 | 6.7 | | | 5.2 | |
| BaO | | 15.0 | | | 12.9 | 6.3 | 12.9 |
| Fe$_2$O$_3$ | 13.8 | 2.5 | | 8.5 | | 3.8 | 7.1 |
| SrO | | | 17.0 | 20.8 | 13.6 | | 12.5 |
| CaO | | | | | | 4.2 | |
| MgO | | | | | | | |
| Al$_2$O$_3$ | | | | | | | |
| Li$_2$O | | | | | 3.2 | | |

TABLE 6

| | Example | | | | | |
|---|---|---|---|---|---|---|
| | 15 | 16 | 17 | 18 | 19 | 20 |
| SiO$_2$ | 37.5 | 39.7 | 24.3 | 33.0 | 42.9 | 18.8 |
| Na$_2$O | 33.3 | 32.5 | 27.3 | 27.8 | 24.8 | 12.2 |
| K$_2$O | | 12.8 | 3.3 | | 6.1 | 33.6 |
| P$_2$O$_5$ | 7.9 | 5.6 | 9.6 | 12.5 | 5.4 | 8.9 |
| B$_2$O$_3$ | 3.7 | 4.7 | 6.6 | 4.0 | | 3.7 |
| BaO | | | 6.0 | 5.7 | 11.3 | 6.4 |
| Fe$_2$O$_3$ | 6.0 | 4.7 | | | 2.2 | 1.6 |
| SrO | | | | 5.1 | 7.4 | 4.1 |
| CaO | | | 8.1 | | | 4.3 |
| MgO | | | 1.9 | | | |
| Al$_2$O$_3$ | | | 9.0 | 11.9 | | 3.9 |
| Li$_2$O | 11.6 | | | | | 2.5 |

TABLE 7

| | | Qualtzite brick | |
|---|---|---|---|
| Chemical composition | SiO$_2$ | 94 | % |
| | Al$_2$O$_3$ | 0.9 | |
| | CaO | 0.4 | |
| | Fe$_2$O$_3$ | 2.5 | |
| | MgO | 0.7 | |
| | Na$_2$O + K$_2$O | 0.2 | |
| Strong heating loss | | 2.7 | % |
| Compression strength (MN/m$^2$) | | 37.3 | |
| Void ratio | | 21.0 | % |
| Bulk specific gravity | | 1.82 | |
| Degree of fire resistance | | 33 | |

TABLE 8

| | 1 | 2 | 3 | 4 |
|---|---|---|---|---|
| Water glass No. 1 | | 60 | | |
| Water glass No. 2 | | | | 30 |
| Water glass No. 3 | | | 50 | |
| Sodium silicate | 40 | | | |
| Potassium silicate | | | | |
| Sodium borate | | 5 | | 8 |
| Sodium dihydrogen phosphate | | | | |
| Potassium pyrophosphate | | | | |
| Sodium hexametaphosphoric acid | | | | |
| Calcium phosphate | | | | |
| Aluminum phosphate | | | | |
| Barium sulfate | | | | |
| Barium nitrate | | | | |
| Potassium ferrocyanate | | | | |
| Fe (II) sulfate | | | | |
| Strontium carbonate | | | | |
| Strontium chloride | | | | |
| Magnesium carbonate | | | | |
| Aluminum oxide | | | | |
| Sodium aluminate | | | | |
| Lithium hydroxide | | 5 | 5 | 2 |
| Water | 60 | 30 | 45 | 60 |
| Hot adhesive property of the glaze surface | Δ | x | Δ | x |
| Adhesion between glaze layer and bricks | Δ | Δ | Δ | Δ |
| Smoothness of the glaze surface layer | Δ | Δ | Δ | Δ |
| Hot impact resistance of the glaze layer surface | Δ | Δ | Δ | Δ |

Hot adhesive property of the glaze surface
⊚ Not adhesive at all ◯ Little adhesive Δ Slightly adhesive x strongly adhesive
Adhesion between glaze layer and bricks
⊚ Perfect adhesion ◯ Peeling of about 10% Δ Peeling of about 30% x Peeling of more than 50%
Smoothness of the glaze surface layer
⊚ Perfectly smooth ◯ Partly convex Δ Concave and convex surface
Hot impact resistance of the glaze layer surface
⊚ Tight surface without scratches ◯ Tight surface with partly scratched Δ Cracks at the impact portion

TABLE 9

| | Example | | | |
|---|---|---|---|---|
| | 1 | 2 | 3 | 4 |
| SiO$_2$ | 49.2 | 53.7 | 64.7 | 43.4 |
| Na$_2$O | 50.8 | 35.5 | 21.4 | 42.1 |
| K$_2$O | | | | |
| P$_2$O$_5$ | | | | |
| B$_2$O$_9$ | | 3.4 | | 9.0 |
| BaO | | | | |
| Fe$_2$O$_3$ | | | | |
| SrO | | | | |
| CaO | | | | |
| MgO | | | | |
| Al$_2$O$_3$ | | | | |
| Li$_2$O | | 7.6 | 13.8 | 5.4 |

Industrial Applicability

The coating composition for the carbonization chamber of coke ovens combines SiO$_2$, Na$_2$O or K$_2$O, P$_2$O$_5$, BaO, SrO, and B$_2$O$_3$ or Fe$_2$O$_3$ and thus enables long term protection of firebricks of the coke oven because the composition contributes higher strength, higher impact resistance, better smoothness and greater durability of the firebrick surfaces as compared with conventional coating materials.

What is claimed is:

1. A carbonization chamber glazing composition for coke ovens, comprising a glaze, wherein said glaze comprises:

(1) 18 to 70% by weight of SiO$_2$;

(2) 10 to 60% by weight of at least one compound selected from the group consisting of Na$_2$O and K$_2$O;

(3) 1 to 14% by weight of P$_2$O$_5$;

(4) 0.5 to 25% by weight of BaO (5) 0.5 to 25% by weight of SrO; and (6) at least one compound selected from the group consisting of 0.5 to 10% by weight of $B_2O_3$ and 0.5 to 20% by weight of $Fe_2O_3$.

2. A composition according to claim 1, wherein all or a part of the $P_2O_5$ are formed from one or a plurality of compounds selected from a group comprising potassium phosphate, magnesium phosphate, aluminum phosphate, barium phosphate and iron phosphate.

3. A carbonization chamber glazing composition for coke ovens, wherein said glazing composition is applied by the steps comprising:

preparing an aqueous solution or a slurry of the coating composition;

spraying the solution or slurry on the surface of high temperature firebricks heated at 500° C. to 1400° C.; and maintaining the coating composition at a temperature of 900° C. or more for 30 minutes or more on the surface of the firebricks, thereby forming a glaze comprising:

(1) 18% to 70% by weight of $SiO_2$;

(2) 10 to 60% by weight of at least one compound selected from the group consisting of $Na_2O$ and $K_2O$;

(3) 1 to 14% by weight of $P_2O_5$;

(4) 0.5 to 25% by weight of BaO, (5) 0.5 to 25% by weight of SrO; and (6) at least one compound selected from the group consisting of 0.5 to 10% by weight of $B_2O_3$ and 0.5 to 20% by weight of $Fe_2O_3$.

4. A composition according to claim 1, wherein said $P_2O_5$ is present in the form of the sodium and/or potassium salt of phosphoric acid.

5. A method for applying a coating composition to a coke oven carbonization chamber comprising preparing an aqueous solution or a slurry of the coating composition according to claim 1, spraying said solution or slurry on the surface of high temperature firebricks heated at 500 to 1400° C., and maintaining said coating composition at a temperature of 900° C. or more for 30 minutes or more on the surfaces of said firebricks.

* * * * *